US009032521B2

(12) United States Patent
Amini et al.

(10) Patent No.: US 9,032,521 B2
(45) Date of Patent: May 12, 2015

(54) ADAPTIVE CYBER-SECURITY ANALYTICS

(75) Inventors: Lisa Amini, Yorktown Heights, NY (US); Mihai Christodorescu, Briarcliff Manor, NY (US); Mitchell A. Cohen, Yorktown Heights, NY (US); Srinivasan Parthasarathy, Yonkers, NY (US); Josyula Rao, Briarcliff Manor, NY (US); Reiner Sailer, Scarsdale, NY (US); Douglas L. Schales, Armonk, NY (US); Wietse Z. Venema, Amawalk, NY (US); Oliver Verscheure, Dunboyne (IE)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 12/903,525

(22) Filed: Oct. 13, 2010

(65) Prior Publication Data
US 2012/0096549 A1    Apr. 19, 2012

(51) Int. Cl.
*H04L 29/06* (2006.01)

(52) U.S. Cl.
CPC ................................. *H04L 63/1433* (2013.01)

(58) Field of Classification Search
USPC ......................................................... 726/23
See application file for complete search history.

(56) References Cited

U.S. PATENT DOCUMENTS

| 6,681,331 | B1 | 1/2004 | Munson et al. | |
|---|---|---|---|---|
| 7,185,367 | B2 | 2/2007 | Munson | |
| 7,296,288 | B1 | 11/2007 | Hill et al. | |
| 7,594,270 | B2 | 9/2009 | Church et al. | |
| 2005/0044406 | A1* | 2/2005 | Stute ............................ | 713/201 |
| 2007/0169195 | A1* | 7/2007 | Anand et al. .................... | 726/23 |
| 2007/0294187 | A1 | 12/2007 | Scherrer | |
| 2008/0141374 | A1 | 6/2008 | Sidiroglou et al. | |
| 2008/0148398 | A1 | 6/2008 | Mezack et al. | |
| 2008/0271143 | A1 | 10/2008 | Stephens et al. | |
| 2009/0064337 | A1 | 3/2009 | Chien | |
| 2010/0070498 | A1 | 3/2010 | Zhang et al. | |
| 2010/0115621 | A1* | 5/2010 | Staniford et al. ............... | 726/25 |

OTHER PUBLICATIONS

Yu, Zhenwei, Jeffrey JP Tsai, and Thomas Weigert. "An automatically tuning intrusion detection system." Systems, Man, and Cybernetics, Part B: Cybernetics, IEEE Transactions on 37, No. 2 (2007): 373-384.*

(Continued)

*Primary Examiner* — Vikkram Bali
*Assistant Examiner* — Tracy Mangialaschi
(74) *Attorney, Agent, or Firm* — Cantor Colburn LLP

(57) ABSTRACT

Performing adaptive cyber-security analytics including a computer implemented method that includes receiving a report on a network activity. A score responsive to the network activity and to a scoring model is computed at a computer. The score indicates a likelihood of a security violation. The score is validated and the scoring model is automatically updated responsive to results of the validating. The network activity is reported as suspicious in response to the score being within a threshold of a security violation value.

25 Claims, 4 Drawing Sheets

(56) References Cited

OTHER PUBLICATIONS

Abercrombie, R.K., Sheldon, F.T., Mili, A.; (2009); "Managing Complex IT Security Processes with Value Based Measures"; 2009 IEEE Symposium on Computation Intelligence in Cyber Security; CICS 2009; ISBN: 9781424427697.

Fayssal, S., Hariri, S., Al-Nashif, Y. (2007); "Anomaly-Based Behavior Analysis of Wireless Network Security"; 4th Annual International Conference on Mobile and Ubiquitous Systems: Computing, Networking and Services, MobiQuitoous 2007, 07EX1702, IEEE Computer Society, Article No. 4451054, DOI: 10.1109/MOBIQ2007.4451054.

* cited by examiner

ADAPTIVE CYBER-SECURITY ANALYTICS

BACKGROUND

This invention relates generally to cyber-security monitoring, and more particularly to monitoring incoming security events to determine the existence of security violations.

Current approaches for cyber-security monitoring can be divided into two broad classes: targeted event-based detection and behavioral anomaly detection. Targeted event-based detection involves the creation and maintenance of a set of event detectors for identifying behaviors that are suspicious (i.e., behaviors that are indicative of security violations). Examples of the targeted approach include pattern-based antivirus engines and network intrusion detection systems. Behavioral anomaly detection provides alerts based on behavioral anomalies or deviations from normal steady-state behaviors of users and/or entities in the network. Examples of the behavioral approach include alert correlation and traffic clustering.

The two approaches have their distinctive advantages and disadvantages. For example, targeted detectors produce high-precision alerts with a low rate of false positives. However, targeted detectors cannot automatically handle changes that occur over time in security threats as well as in the normal, steady state network traffic. Many security threats, such as malicious software (malware) evolve automatically and rapidly to evade existing detection mechanisms (e.g., via poly/metamorphism, fast fluxing, sandbox resistance, adversarial reverse engineering, bursty/zero-day attacks, etc.). As security threats evolve over time, targeted detectors require maintenance and updates through the extensive intervention of domain experts. In contrast, the behavioral anomaly detection approach can potentially uncover a broader set of security violations, as well as threats that evolve over time, while requiring a lesser degree of involvement from domain experts. However, behavioral detectors often suffer from higher rates of false positives compared to the targeted approach.

SUMMARY

An embodiment is a computer implemented method for performing security analytics that includes receiving a report on a network activity. A score responsive to the network activity and to a scoring model is computed at a computer. The score indicates a likelihood of a security violation. The score is validated and the scoring model is automatically updated responsive to results of the validating. The network activity is reported as suspicious in response to the score being within a threshold of a security violation value.

Another embodiment is a computer program product for performing security analytics. The computer program product includes a tangible storage medium readable by a processing circuit and storing instructions for execution by the processing circuit for performing a method. The method includes receiving a report on a network activity. A score responsive to the network activity and to a scoring model is computed at a computer. The score indicates a likelihood of a security violation. The score is validated and the scoring model is automatically updated responsive to results of the validating. The network activity is reported as suspicious in response to the score being within a threshold of a security violation value.

A further embodiment is a system for performing security analytics that includes a computer and a security analytics application executable by the computer. The security analytics application is capable of performing a method that includes receiving a report on a network activity. A score responsive to the network activity and to a scoring model is computed at a computer. The score indicates a likelihood of a security violation. The score is validated and the scoring model is automatically updated responsive to results of the validating. The network activity is reported as suspicious in response to the score being within a threshold of a security violation value.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

An embodiment of the present invention is directed to automatically constructing and refining targeted detectors (also commonly referred to as misuse detectors or high-precision detectors), behavioral anomaly detectors, and other scoring approaches and their combinations for performing cyber-security monitoring. An embodiment aids in performing cyber-security monitoring by observing incoming security events and making a determination about whether any of the incoming security events constitute a security violation.

An embodiment includes a unified cyber-security monitoring system that incorporates both targeted detectors and behavioral anomaly detectors. The unified system includes a validation engine that checks the accuracy of the scores produced by the targeted and behavioral detectors, in order to automatically and adaptively improve the performance of existing detectors and create new detectors. In an embodiment, the automatic creation of behavioral and targeted detectors is accomplished through a data-mining/machine learning component, referred to herein as a correlation engine, which collectively analyzes the targeted and behavioral alerts, along with the validation results by invoking automated pattern-mining and feature extraction routines. An embodiment includes a mechanism that automatically updates a scoring engine (which determines suspicion scores for security events) in response to changes in the environment (e.g., appearance of new threats, exploits, etc.).

An embodiment utilizes a targeted approach in conjunction with a behavioral approach in order to improve the performance of both the targeted and behavioral approaches. This is contrasted with contemporary solutions that focus exclusively either on the targeted approach or the behavioral approach, thereby losing the advantages of the one or the other. In addition, an embodiment utilizes automatic pattern extraction which allows combinations of atomic behavioral detectors to be automatically converted into a high-precision targeted detector, as well as automatic feature extraction which analyzes the high-precision targeted alerts in order to automatically create new behavioral detectors of interest. These capabilities are utilized to provide automated detection of polymorphic and time evolving cyber-security attacks.

Figure 1:
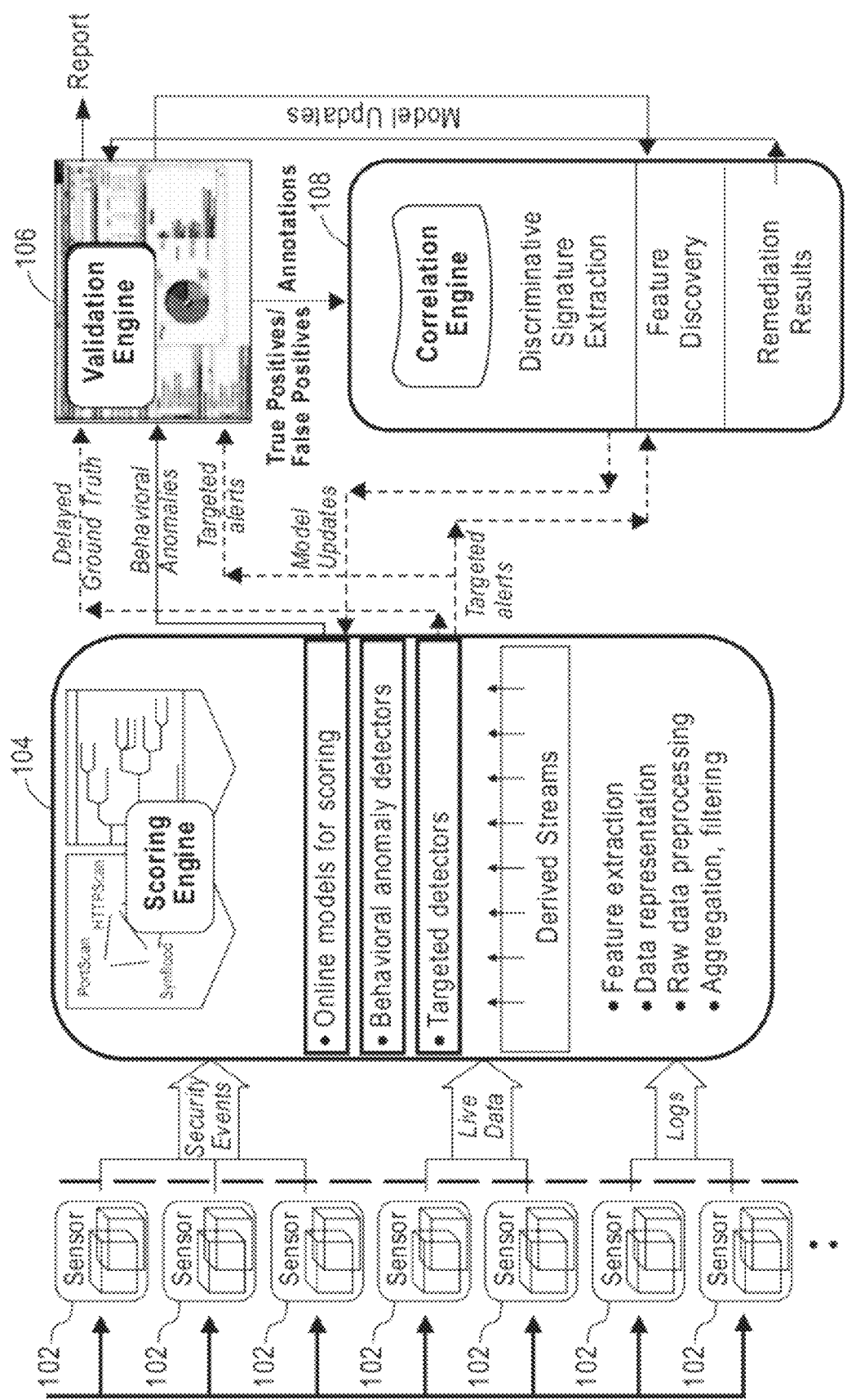
FIG. 1 illustrates a block diagram of a system for security analytics in accordance with an embodiment.

FIG. 1 illustrates a block diagram of a system for adaptive security analytics in accordance with an embodiment. The embodiment depicted in FIG. 1 is utilized for detecting and analyzing malicious software ("malware") such as, but not limited to, botnets. As used herein, the term "botnet" refers to software that infects computers over a network, and subsequently seeks/accepts commands from an external controller (i.e., a bot-controller), thereby making the host computer amenable for a variety of subversive and/or illegal activities such as, but not limited to: denial-of-service attacks, spamming, insider fraud, and ex-filtration.

As shown in FIG. 1, network activity data from multiple sources is received into a scoring engine 104. Network activity data may be received in a variety of different input schemas and may have a variety of different information contents. FIG. 1 shows sensors 102 that detect the availability of the network activity data from a variety of existing sources and that transmit the network activity data to a scoring engine 104. The network activity data may include, but is not limited to, data relating to security events that is taken from live data and logs. The live data and logs may include, but are not limited to: streaming (high-throughput/high-volume) data sources such as intrusion detection systems (IDS)/intrusion prevention systems (IPS) alerts, firewall alerts and/or logs, domain name server (DNS) queries and responses, netflow records, and raw network traffic and/or traces, as well as other data sources such as security updates (e.g., software patches and vulnerability discovered and published in the public domain).

The system depicted in FIG. 1 also includes the scoring engine 104, a validation engine 106, and a correlation engine 108. In the embodiment depicted in FIG. 1, the scoring engine 104 receives the network activity data and performs initial pre-processing steps including, but not limited to: feature extraction, data representation, raw data preprocessing, and/or aggregation/filtering. As used herein the term "feature" refers to any attribute or value, which can be computed using the incoming data. For instance, if the incoming data includes an IP address, we could compute if the IP address is a residential or a commercial IP address, which country the IP address belongs to, and which autonomous system it belongs. These are extra features computed using the basic information (IP address) available in the data. Feature extraction refers to the process of obtaining all the necessary features. Data representation refers to the process of transforming the incoming data and the derived features into an appropriate schema (or format) for future consumption. Raw data preprocessing refers to transformations done on the raw incoming data. Aggregation refers to combining multiple data items into a single data record and filtering refers to eliminating data records that are deemed to be not of interest for further analysis.

In an embodiment, initial pre-processing is performed on all of the network activity data that is received by the scoring engine 104. The initial pre-processing generates derived data streams to aid in the subsequent analysis by the on-line models in the scoring engine 104. In another embodiment, initial pre-processing is not performed on all or a subset of the network activity data (e.g., because it is already in a format that is usable by the scoring engine 104) prior to analysis by the on-line models in the scoring engine 104. In the embodiment depicted in FIG. 1, the derived streams are fed into two distinct types of detectors: targeted detectors that output targeted alerts; and behavioral anomaly detectors that output behavioral abnormalities.

As known in the art, targeted detectors identify specific events that are known to be suspicious and/or that are security violations. Targeted detectors are generally employed by anti-virus products, and, for example, may be used to perform malware detection based on access to particular domains. Targeted detectors may be utilized to generate targeted alerts by looking for known patterns in data received from intrusion detection systems (IDS)/intrusion prevention systems (IPS). Targeted detectors may also be utilized to generate targeted alerts based on detecting accesses to particular domain names or to detecting certain pre-defined access patterns. As shown in FIG. 1, the results of the targeted detectors are input to one or more online scoring modules to calculate a score that reflects a likelihood that the a security violation has occurred. This score, referred to in FIG. 1 as a targeted alert is output to the correlation engine 108 and to the validation engine 106.

As is known in the art, behavioral anomaly detectors are used to identify deviations from typical behavior of the system and/or network. Behavioral anomaly detectors determine what is normal behavior and then look for deviations from the normal behavior. For example, a typical host system may have "x" number of queries sent with a time period, "y" number of established connections at any given time, and "z" queries received within a given time period. If different values are detected for one or more of these features, then a behavioral anomaly detector is used to determine if the values reflect a behavioral abnormality. Behavioral anomaly detectors may be employed by managed security services, and may be used to detect abnormal situations such as, but not limited to: a SYN flood in a distributed denial of service (DDoS), to determine if an excessive number of DNS query volumes have been accessed when compared to a typical host, to detect shifts in DNS/netflow per-group volumes, and/or to detect shifts in the set of domain names/IPs/countries/ASNs accessed.

As shown in FIG. 1, the results of the behavioral anomaly detectors are input to one or more online scoring modules to calculate a score that reflects a likelihood that a security violation has occurred based, for example, on the magnitude of the deviation (if any). This score, referred to in FIG. 1 as a behavioral abnormality, is output to the validation engine 106. In an embodiment, the online scoring module(s) utilizes decision trees based on past scores and/or consensus scores.

The validation engine 106 separates true alerts that are indicative of security violations (e.g., botnets) from false positives. For example, a behavioral abnormality could potentially be validated by targeted alerts that are currently generated or generated in the future (this case is referred to as delayed validation via delayed ground truth), validated via a human expert, and/or validated by other more expensive methods such as intrusive probing of hosts in the network. The results of the validation, including true positives/false positives, and annotations are sent to the correlation engine 108. In and embodiment, the results of the validation are also reported to a user so that corrective action can be taken and/or to security reporting system so that the result is logged.

The correlation engine 108 uses data mining techniques to mine new behavioral signatures (e.g., for botnet detection) as well as to discover new features that are of interest. Data utilized for the data mining include data resulting from network traffic of the hosts (e.g., DNS queries and responses, netflow, raw IP traffic, http traffic, other application traffic), IDS or IPS alerts related to a specific host, etc. Examples of algorithms utilized by the mining may include, but are not limited to: feature extraction algorithms for automatically constructing atomic anomaly detectors, discriminative pattern extraction algorithms for automatically constructing misuse detectors, concept drift detection algorithms, learning algorithms, feature discovery algorithms such as model-based tree (MbT) algorithms and consensus maximization. Discriminative pattern extraction refers to an algorithm (such as MbT) which is capable of examining the set of features and validation results and decide on an appropriate model for scoring future data records with the objective of minimizing false alarms and maximizing detection rate. Discriminative pattern mining is performed by the MbT algorithm in an embodiment. Feature discovery refers to the process of deciding which features are performing well in terms of leading to correct results (as indicated by the validation step), and which features need to be excluded. MbT is also capable of performing feature extraction in addition to discriminative pattern extraction, and this is utilized in the embodiment for feature discovery.

The newly discovered behavioral patterns as well as targeted detectors constructed out of the newly mined features are deployed back in the scoring engine 104 as model updates that impact one or more of the online models for scoring, the behavioral anomaly detectors and the targeted detectors. In this manner, continuous and timely updates are made to the scoring engine 104. In addition, the model updates are communicated to the validation engine.

Thus, an embodiment of the system may be utilized to automatically construct and refine targeted detectors, and other scoring approaches and their combinations. In an embodiment this is performed using the existing targeted detectors to automatically extract discriminative features in the data and by building behavioral anomaly detectors over time that distinguish between normal and suspicious events. An embodiment also composes individual anomaly detector to build high-precision targeted detectors over time and provides a unified way of scoring events or entities that are being monitored using both targeted and anomaly detectors. In addition, an embodiment utilizes the results of alert validation for constructing and refining detectors and scoring models.

An end-to-end example is now discussed which describes the process of feature generation, scoring using targeted analytics, validation, and discriminative feature extraction. An example of a misuse pattern (or a targeted detection technique) occurs in the case of fast-fluxing bots: if a host accesses websites which are not popular (in terms of the number of visits to the website per day) but at the same time if the IP address associated with the website keeps fluxing (or changing) frequently across countries, as well as across domains that are not necessarily commercial, then it is highly indicative of fast-flux bot activity. This is a targeted analytic which can be used to provide a suspicion score to hosts based on their web access patterns. After scores have been computed using a collection of such targeted analytics, additional features can be derived (such as DNS query rates, response rates, number of countries visited per day, number of domains visited which do not have a valid DNS resolution, etc.) for hosts. This is the step of feature extraction. A classification model can be built based on these features and the scores (which are treated as class labels): for e.g., a decision tree. In this case, the decision tree building algorithm is the discriminative signature extraction algorithm. The decision tree can be deployed and the scores produced b the decision tree can be monitored over a period of time. The decision tree labels hosts as suspicious and normal. These labels can be validated using orthogonal mechanisms: for instance, did the suspicious hosts (over a period of time) visit any website which was known or later discovered to be a malicious website? Did the hosts deemed normal by the decision tree do the same? The results of this validation step can be fed back into the MbT algorithm in the correlation engine which could remove some of the existing features and add new features so that a better decision tree can be created for the future. This end-to-end example describes a complete lifecycle the approach taken in an embodiment.

Figure 2:
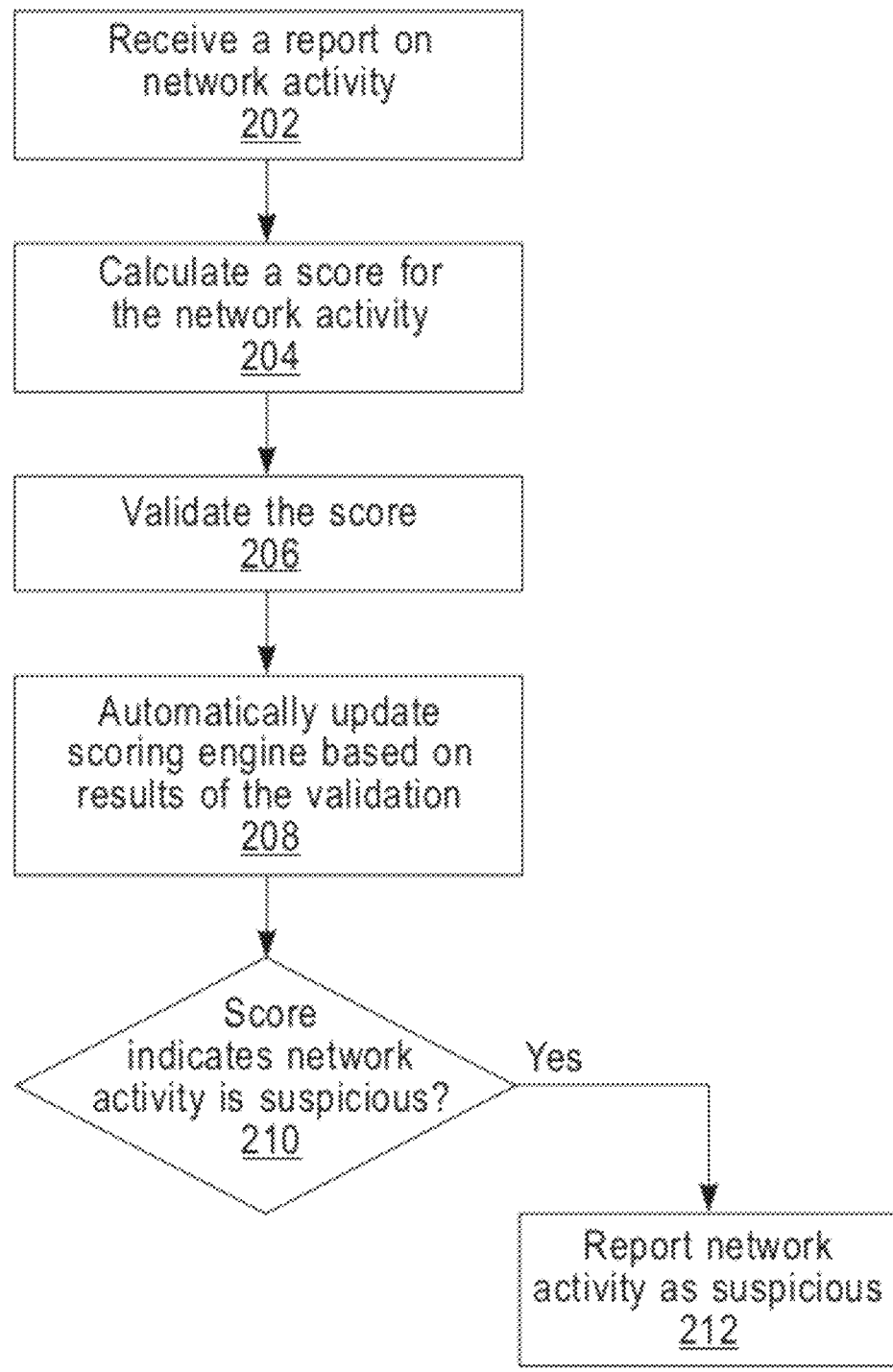
FIG. 2 illustrates a process flow for performing security analytics in accordance with an embodiment.

FIG. 2 illustrates a process flow for performing security analytics in accordance with an embodiment. In an embodiment, the process flow is performed using the system depicted in FIG. 1. At block 202, a report on network activity is received. In an embodiment, this includes one or more of the derived streams of data described previously. In another embodiment, this includes the network activity received from one or more sensors 102. At block 204, a score is calculated for the network activity (e.g., by the scoring engine 104). In an embodiment, the score is calculated by a weighted combination of the individual scores provided by the various targeted and behavioral analytics instantiated in the system.

At block 206, the score is validated (e.g., by the validation engine 106). In an embodiment, the score is valid if it is determined that a behavioral anomaly or targeted alert that was associated with a score that indicated a security violation really turned out to be a security violation. At block 208, one or more of the online models in the scoring engine 104 are updated based on the results of the validation. If the score was valid, this is reflected in the updated online models. If the score was not valid, this is also reflected in the updated online models.

At block 210, it is determined if the score indicates that the network activity is suspicious. In an embodiment, block 210 is performed by comparing the score to a value, referred to herein as a "security violation value." If the score is within a threshold of the security violation value, then the network activity is deemed to be suspicious (i.e., it is likely that the network activity indicates that a security violation has occurred). In an embodiment, the threshold and/or the security violation value are user defined and programmable. If it is determined that the network activity is suspicious, then block 212 is performed and the network activity is reported as being suspicious. In an embodiment, the reporting is performed by sending an alert to an operator, logging the suspicious activity and/or by sending an alert to an automated network system. Different types of reporting may be performed (e.g., based on the score of the network activity, based on the type of network activity, etc.).

Figure 3:
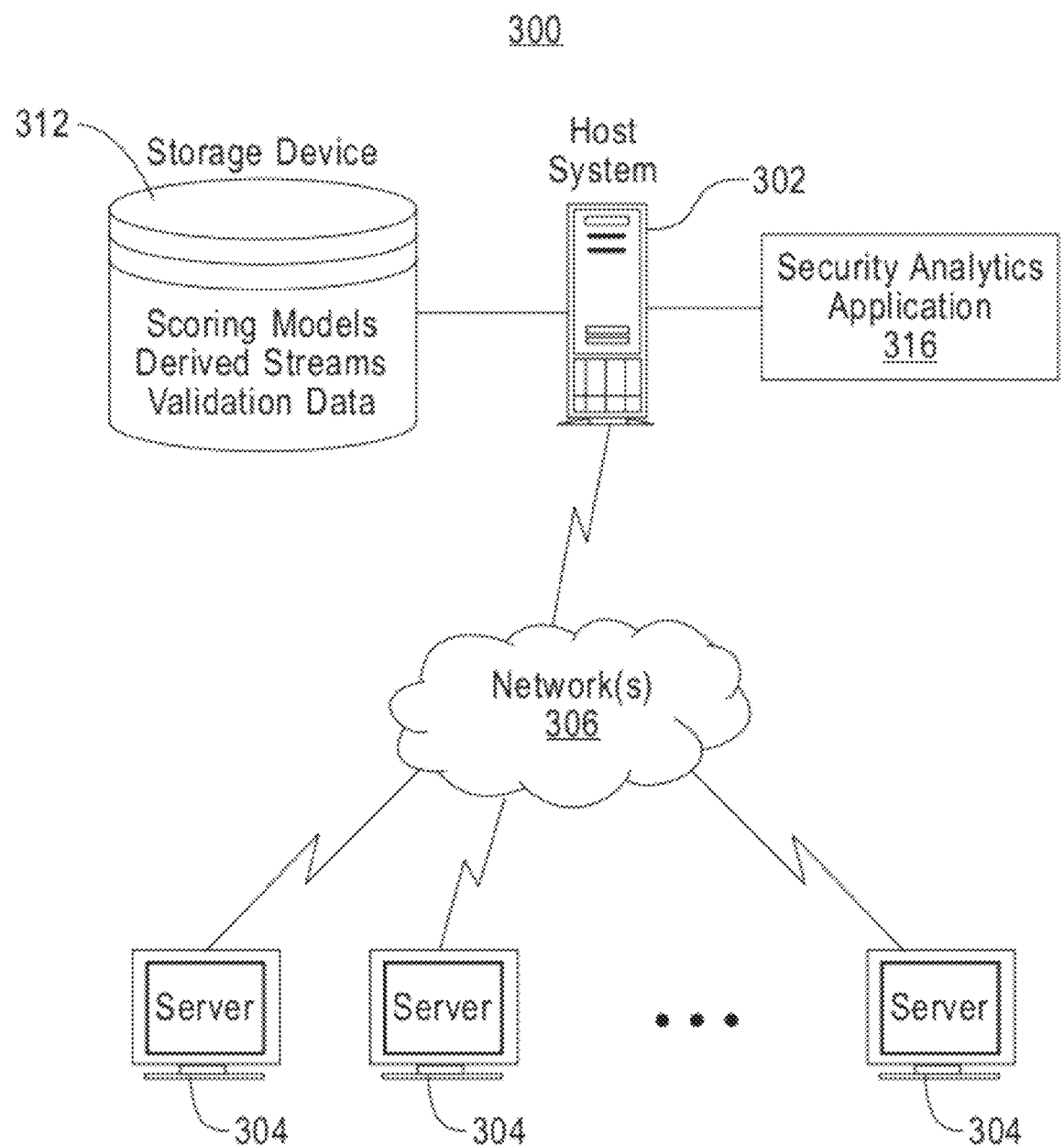
FIG. 3 illustrates a computing system for implementing security analytics in accordance with an embodiment.

FIG. 3 illustrates a computing system for computing security analytics in accordance with an embodiment. Turning now to FIG. 3, a block diagram of a system 300 upon which computing security analytics is implemented in accordance with an embodiment will now be described. The system 300 of FIG. 3 includes a host system 302 in communication with sensors 304 via one or more network(s) 306. Host system 302 may be implemented using one or more servers operating in response to a computer program stored in a storage medium accessible by the server(s). The host system 302 may operate as a network server (e.g., a web server) to communicate with one or more sensors 102 located at one or more client or host systems to gather data related to network security events. The host system 302 may handle sending and receiving information to and from the sensors 304 and may perform associated tasks.

The host system 302 may also operate as an application server. In accordance with exemplary embodiments, the host system 302 executes one or more computer programs to provide security analytics. These one or more computer programs are referred to collectively herein as a security analytics application 316. In an embodiment, the security analytics application 316 performs the processing flow depicted in FIG. 2, and includes the scoring engine 104, validation engine 106, and correlation engine 108 of FIG. 1.

Security analytics activities may be shared by one or more other systems such as client systems and/or other host systems (not shown) by providing an application (e.g., java applet) to the other systems. Alternatively, the other systems may include stand-alone software applications for performing a portion of the processing described herein. In yet further embodiments, the security analytics functions may be built in to a web browser application executing on the other systems. As previously described, it is understood that separate servers may be utilized to implement the network server functions and the application server functions of host system 302. Alternatively, the network server and the application server may be implemented by a single server executing computer programs to perform the requisite functions described with respect to host system 302.

As shown in FIG. 3, the sensors 304 may be coupled to host system 302 via one or more network(s) 306.

In an embodiment, the security analytics system 300 shown in FIG. 3 includes a storage device 312. Storage device 312 is in communication with host system 302 and may be implemented using a variety of devices for storing electronic information. It is understood that the storage device 312 may be implemented using memory contained in the host system 302 or it may be a separate physical device, e.g., as shown in FIG. 3. The storage device 312 is logically addressable as a consolidated data source across a distributed environment that includes network(s) 306. Information stored in the storage device 312 may be retrieved and manipulated via the host system 302 and authorized users of other systems. The storage device 312 may house data that includes, but is not limited to: the scoring models, the derived streams, as well as the validation data, among other information desired by the service provider of host system 302. In an exemplary embodiment, the host system 302 operates as a database server and coordinates access to application data including data stored on storage device 312.

Network 306 may be any type of known network including, but not limited to, a wide area network (WAN), a local area network (LAN), a global network (e.g. Internet), a virtual private network (VPN), and an intranet. The network 306 may be implemented using a wireless network or any kind of physical network implementation known in the art. One or more of the sensors 304 and the host system 302 may be connected to the network(s) 306 in a wireless fashion.

Technical effects and benefits include better cyber attack detection capabilities (e.g., due to combining the use of at least two different types of detectors) at a lower cost (e.g., decreased human intervention).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
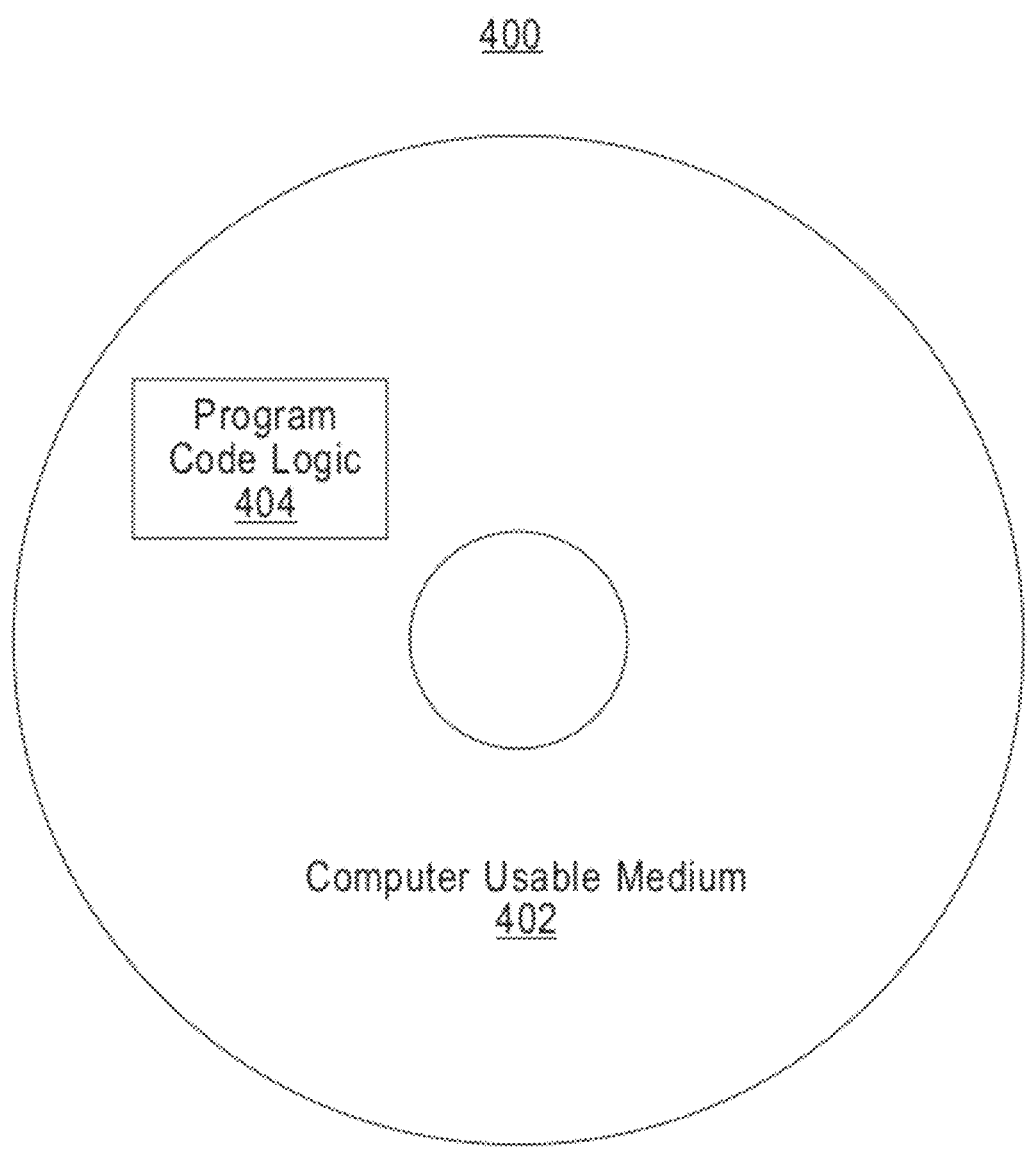
FIG. 4 illustrates a computer program product that may be implemented in accordance with an embodiment.

As described above, embodiments can be embodied in the form of computer-implemented processes and apparatuses for practicing those processes. In exemplary embodiments, the invention is embodied in computer program code executed by one or more network elements. Embodiments include a computer program product 400 as depicted in FIG. 4 on a computer usable medium 402 with computer program code logic 404 containing instructions embodied in tangible media as an article of manufacture. Exemplary articles of manufacture for computer usable medium 402 may include floppy diskettes, CD-ROMs, hard drives, universal serial bus (USB) flash drives, or any other computer-readable storage medium, wherein, when the computer program code logic 404 is loaded into and executed by a computer, the computer becomes an apparatus for practicing the invention. Embodiments include computer program code logic 404, for example, whether stored in a storage medium, loaded into and/or executed by a computer, or transmitted over some transmission medium, such as over electrical wiring or cabling, through fiber optics, or via electromagnetic radiation, wherein, when the computer program code logic 404 is loaded into and executed by a computer, the computer becomes an apparatus for practicing the invention. When implemented on a general-purpose microprocessor, the computer program code logic 404 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for performing security analytics, the method comprising:
   receiving a report on a network activity in a network;
   calculating, at a computer, a score responsive to the network activity and to a scoring model, the score indicating a likelihood of a security violation;
   validating the score, wherein validating includes probing of one or more hosts in the network and determining if the security violation is a true alert or a false positive;
   automatically updating the scoring model responsive to determining that the security violation is a true alert; and
   reporting the network activity as suspicious in response to the score being within a threshold of a security violation value.

2. The method of claim 1, wherein the calculating is further responsive to a targeted detector and to a behavioral anomaly detector.

3. The method of claim 1, wherein the calculating is further responsive to at least one pattern of a known bad action.

4. The method of claim 1, wherein the calculating is further responsive to a behavioral anomaly detector.

5. The method of claim 1, wherein the automatically updating the scoring model comprises utilizing feature extraction algorithms for constructing anomaly detectors.

6. The method of claim 1, wherein the automatically updating the scoring model comprises utilizing discriminative pattern extraction for constructing a targeted detector.

7. The method of claim 1, wherein the automatically updating the scoring model comprises utilizing concept drift detection algorithms for monitoring the scoring model.

8. The method of claim 1, wherein the automatically updating the scoring model comprises utilizing a learning algorithm.

9. The method of claim 1, wherein the validating comprises utilizing a time delayed alert.

10. A computer program product for performing security analytics, the computer program product comprising:
    a non-transitory tangible storage medium readable by a processing circuit and storing instructions for execution by the processing circuit for performing a method comprising:
    receiving a report on a network activity in a network, calculating a score responsive to the network activity and to a scoring model, the score indicating a likelihood of a security violation;

validating the score, wherein validating includes probing of one or more hosts in the network and determining if the security violation is a true alert or a false positive;

automatically updating the scoring model responsive to determining that the security violation is a true alert; and reporting the network activity as suspicious in response to the score being within a threshold of a security violation value.

11. The computer program product of claim 10, wherein the calculating is further responsive to a targeted detector and to a behavioral anomaly detector.

12. The computer program product of claim 10, wherein the calculating is further responsive to at least one pattern of a known bad action.

13. The computer program product of claim 10, wherein the calculating is further responsive to a behavioral anomaly detector.

14. The computer program product of claim 10, wherein the automatically updating the scoring model comprises utilizing feature extraction algorithms for constructing anomaly detectors.

15. The computer program product of claim 10, wherein the automatically updating the scoring model comprises utilizing discriminative pattern extraction for constructing a targeted detector.

16. The computer program product of claim 10, wherein the automatically updating the scoring model comprises utilizing concept drift detection algorithms for monitoring the scoring model.

17. The computer program product of claim 10, wherein the automatically updating the scoring model comprises utilizing a learning algorithm.

18. The computer program product of claim 10, wherein the validating comprises utilizing a time delayed alert.

19. A system for performing security analytics, the system comprising:

a computer; and security analytics application executable by the computer, the security analytics application performing a method comprising:

receiving a report on a network activity in a network, calculating, at a computer, a score responsive to the network activity and to a scoring model, the score indicating a likelihood of a security violation;

validating the score, wherein validating includes probing of one or more hosts in the network and determining if the security violation is a true alert or a false positive;

automatically updating the scoring model responsive to determining that the security violation is a true alert; and reporting the network activity as suspicious in response to the score being within a threshold of a security violation value.

20. The system of claim 19, wherein the calculating is further responsive to a targeted detector and to a behavioral anomaly detector.

21. The system of claim 19, wherein the automatically updating the scoring model comprises utilizing feature extraction algorithms for constructing anomaly detectors.

22. The system of claim 19, wherein the automatically updating the scoring model comprises utilizing discriminative pattern extraction for constructing a targeted detector.

23. The system of claim 19, wherein the automatically updating the scoring model comprises utilizing concept drift detection algorithms for monitoring the scoring model.

24. The system of claim 19, wherein the automatically updating the scoring model comprises utilizing a learning algorithm.

25. The system of claim 19, wherein the validating comprises utilizing a time delayed alert.

* * * * *